(12) United States Patent
Chen et al.

(10) Patent No.: US 9,079,595 B2
(45) Date of Patent: Jul. 14, 2015

(54) MOBILE CART

(71) Applicants: Kung-Cheng Chen, Taichung (TW); Lung-Chuan Huang, Taichung (TW)

(72) Inventors: Kung-Cheng Chen, Taichung (TW); Lung-Chuan Huang, Taichung (TW)

(73) Assignee: E-MAKE CO., LTD., Taichung (TW)

( * ) Notice: Subject to any disclaimer, the term of this patent is extended or adjusted under 35 U.S.C. 154(b) by 54 days.

(21) Appl. No.: 14/102,876

(22) Filed: Dec. 11, 2013

(65) Prior Publication Data

US 2015/0158516 A1    Jun. 11, 2015

(51) Int. Cl.
| | |
|---|---|
| *B62B 3/00* | (2006.01) |
| *B62B 9/00* | (2006.01) |
| *B62B 7/00* | (2006.01) |
| *B62B 3/02* | (2006.01) |

(52) U.S. Cl.
CPC .. *B62B 3/005* (2013.01); *B62B 3/02* (2013.01)

(58) Field of Classification Search
USPC .......... 280/47.371, 47.31, 47.11, 43.1, 47.35, 280/64, 65, 29, 79; 16/35 R; 190/18 A; 312/351.11, 351.13, 351, 294, 216, 312/218
See application file for complete search history.

(56) References Cited

U.S. PATENT DOCUMENTS

| | | | | |
|---|---|---|---|---|
| 2,925,283 | A  * | 2/1960 | Stilger | ............................. 280/37 |
| 3,946,839 | A  * | 3/1976 | Butler | ......................... 190/18 A |
| 4,668,029 | A  * | 5/1987 | Maizlish et al. | ......... 312/351.13 |
| 5,558,027 | A  * | 9/1996 | Williams et al. | ............. 280/43.2 |
| 6,149,168 | A  * | 11/2000 | Pauser et al. | ............. 280/47.371 |
| 6,520,514 | B2 * | 2/2003 | Clegg | ......................... 280/47.26 |
| 6,604,615 | B2 * | 8/2003 | Wu | ............................. 190/18 A |
| 6,769,701 | B1 * | 8/2004 | Clausen | ........................ 280/37 |
| 6,935,641 | B2 * | 8/2005 | Hahn | ......................... 280/47.19 |
| 7,278,644 | B2 * | 10/2007 | Villarreal | .................. 280/47.26 |

\* cited by examiner

*Primary Examiner* — J. Allen Shriver, II
*Assistant Examiner* — James M Dolak

(57) ABSTRACT

A cart includes four wheel assemblies disposed on four bottom corners of a support body respectively, each wheel assembly including a hollow cylinder, a biasing member in the hollow cylinder, a roller having a partially threaded shank inserted through the biasing member and the hollow cylinder into the support body for fastening, and a threaded fastener secured to the partially threaded shank; four lock sleeves each secured onto the hollow cylinder. In a ready to wheel or wheeling state, the partially threaded shank is rested on a top of the hollow cylinder, and both the cylinder and the lock sleeve are above a bottom end of the roller. In response to a user sitting on the support body, both the hollow cylinders and the lock sleeves are pushed down with the biasing members being further compressed until both the hollow cylinders and the lock sleeves contact a supporting ground.

4 Claims, 15 Drawing Sheets

MOBILE CART

BACKGROUND OF THE INVENTION

1. Field of the Invention

The invention relates to carts and more particularly to a mobile cart which can remain stationary by sitting thereon.

2. Description of Related Art

Conventionally, a mobile tool cart having drawers for storing tools is provided with a flat top. Some such carts have brakes for stopping moving if such need arises. However, a user has to bend the body to operate the brakes located proximate to the wheels (or the casters) of the cart. This is inconvenient.

U.S. Pat. No. 2,033,037 discloses a coaster stool. A user can be seated while executing work, relieving the user from stooping over or standing while at work in trimming lawns.

Notwithstanding the prior art, the invention is neither taught nor rendered obvious thereby.

SUMMARY OF THE INVENTION

It is therefore one object of the invention to provide a cart comprising a support body; a plurality of drawers slidably disposed in the support body; four wheel assemblies disposed on four bottom corners of the support body respectively, each of the wheel assemblies includes a hollow cylinder, a biasing member disposed in the hollow cylinder, a roller biased downward by the biasing member and having a partially threaded shank inserted through the biasing member and the hollow cylinder into the support body for fastening, and a threaded fastener secured to the partially threaded shank; four lock sleeves each secured onto the hollow cylinder; wherein in a ready to wheel or wheeling state, the partially threaded shank of each of the wheel assemblies is rested on a top of the hollow cylinder, and both the cylinder and the lock sleeve are above a bottom end of the roller of each of the wheel assemblies; and wherein in response to a force exerted on the top of the support body greater than a predetermined value, both the hollow cylinders and the lock sleeves are pushed down with the biasing members being further compressed until bottoms of both the hollow cylinders and the lock sleeves are flush with a bottom of the roller of each of the wheel assemblies.

The above and other objects, features and advantages of the invention will become apparent from the following detailed description taken with the accompanying drawings.

DETAILED DESCRIPTION OF THE INVENTION

Figure 1:
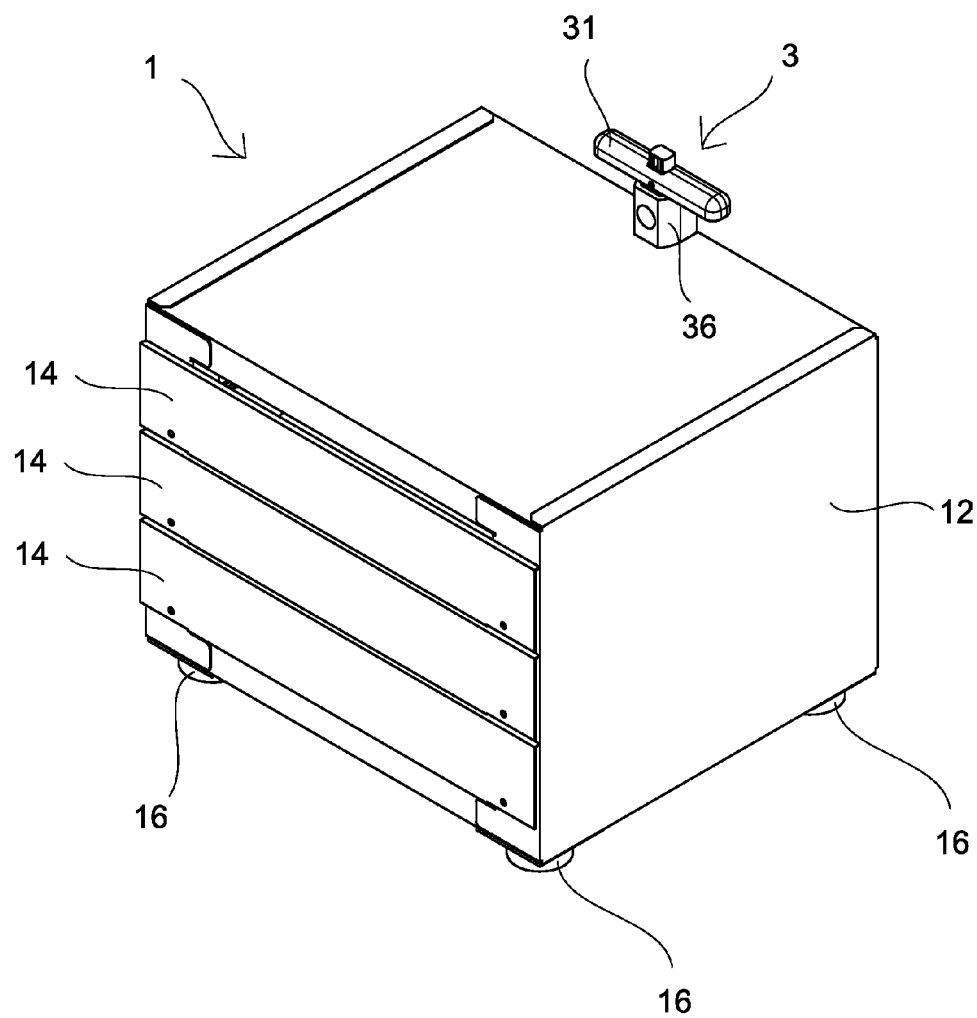
FIG. 1 is a perspective view of a mobile cart having wheels, a telescopic handle, and drawers according to the invention.
Figure 2:
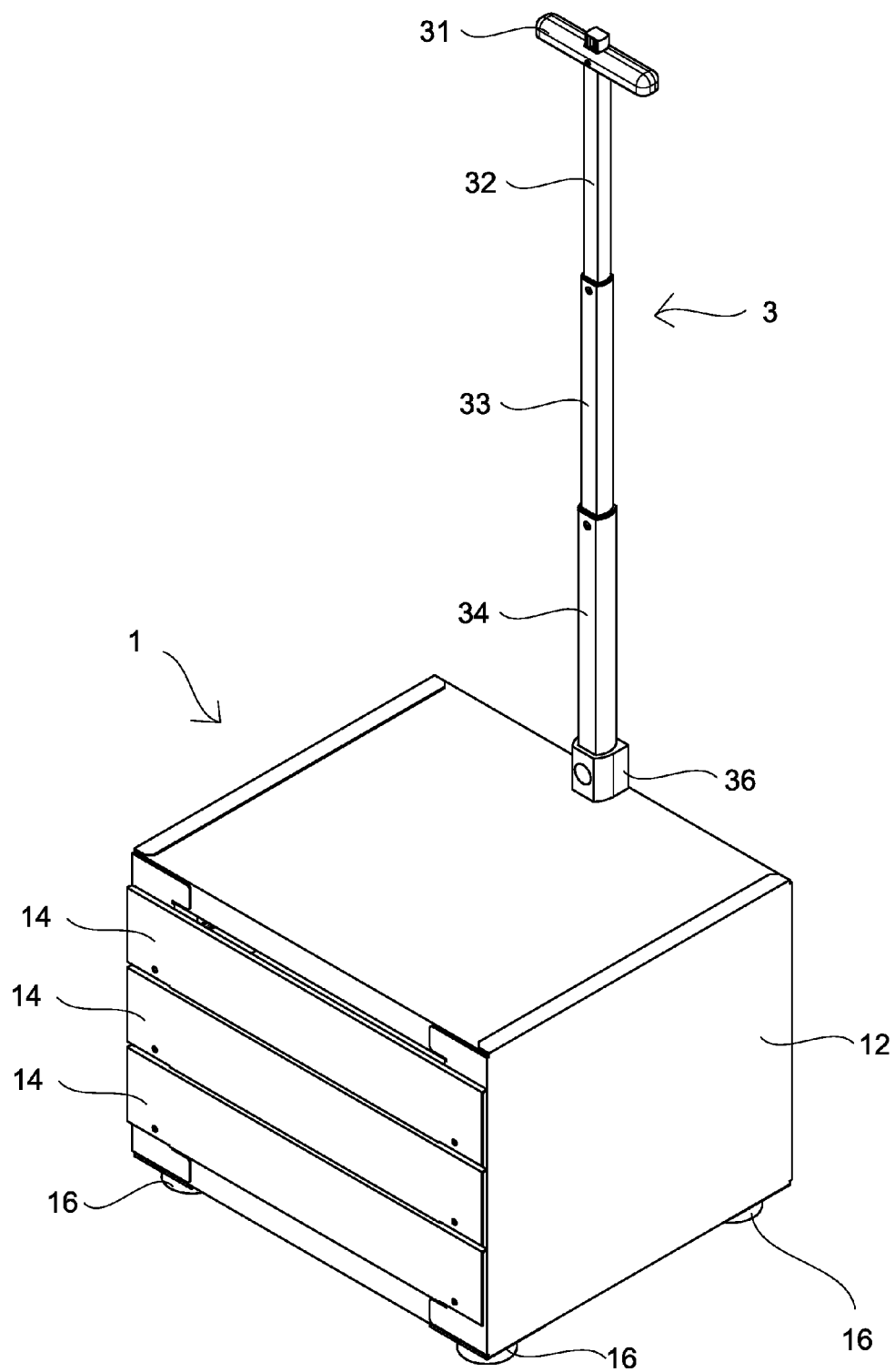
FIG. 2 is a view similar to FIG. 1 with the handle being fully pulled.
Figure 3:
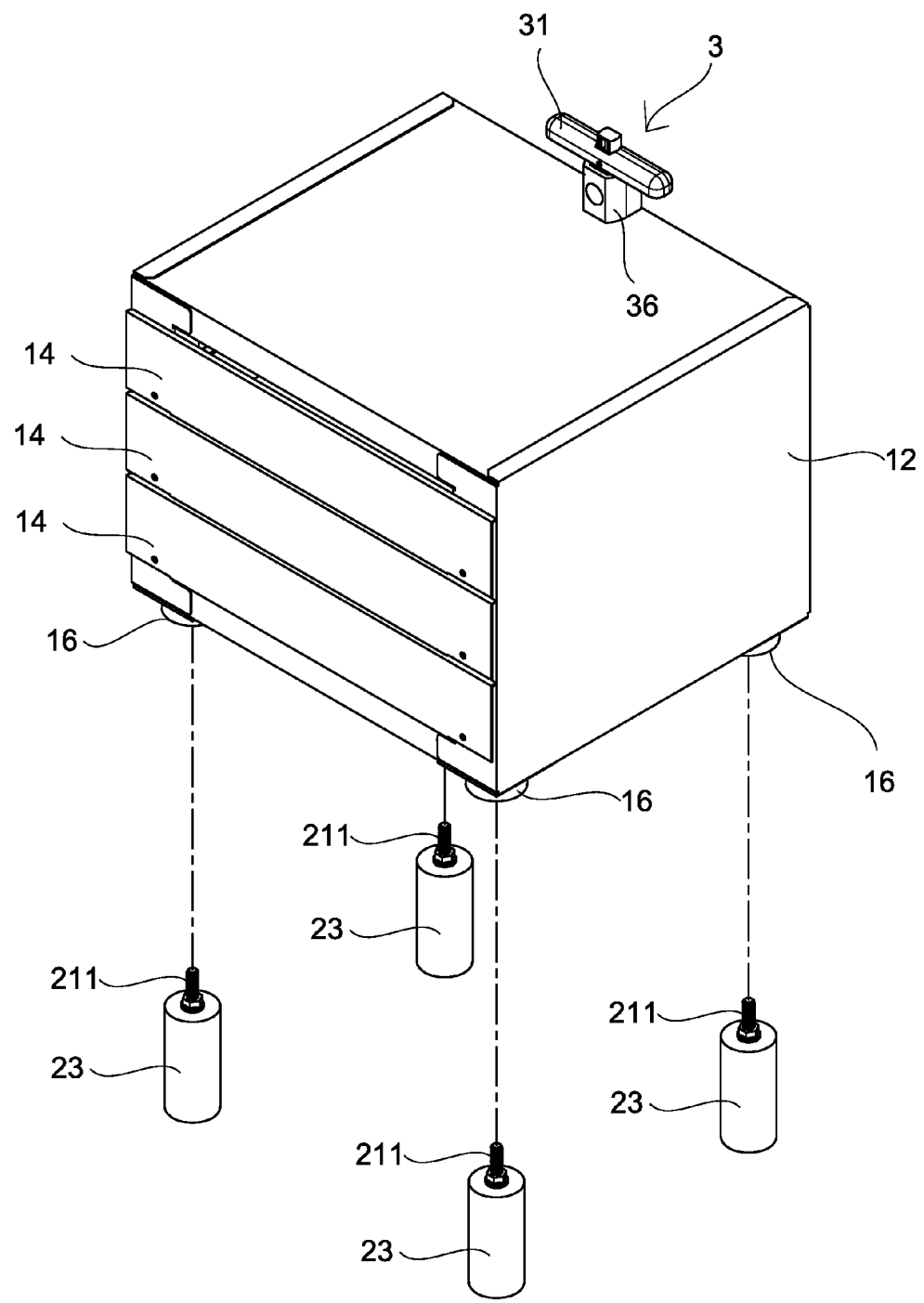
FIG. 3 is a view similar to FIG. 1 with the wheel assemblies detached.
Figure 4:
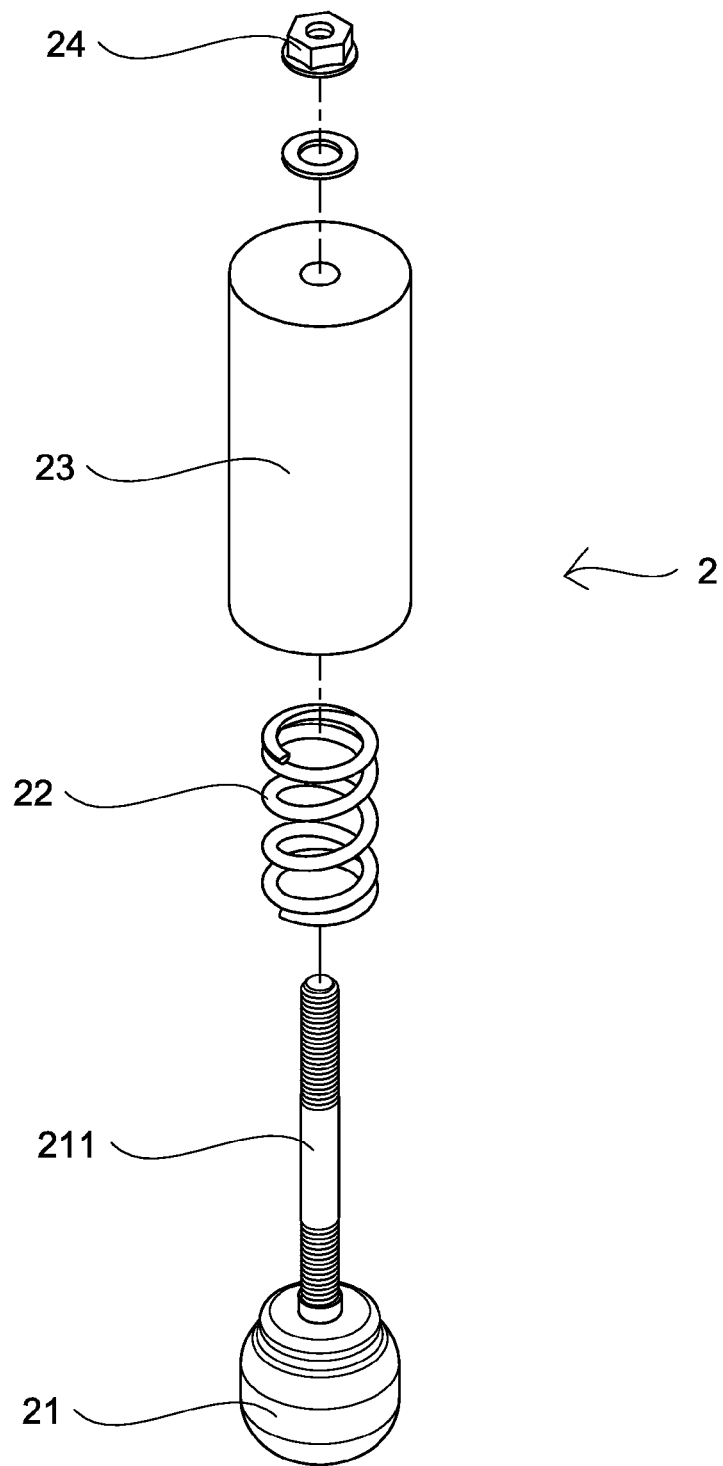
FIG. 4 is an exploded view of the wheel assembly.
Figure 5:
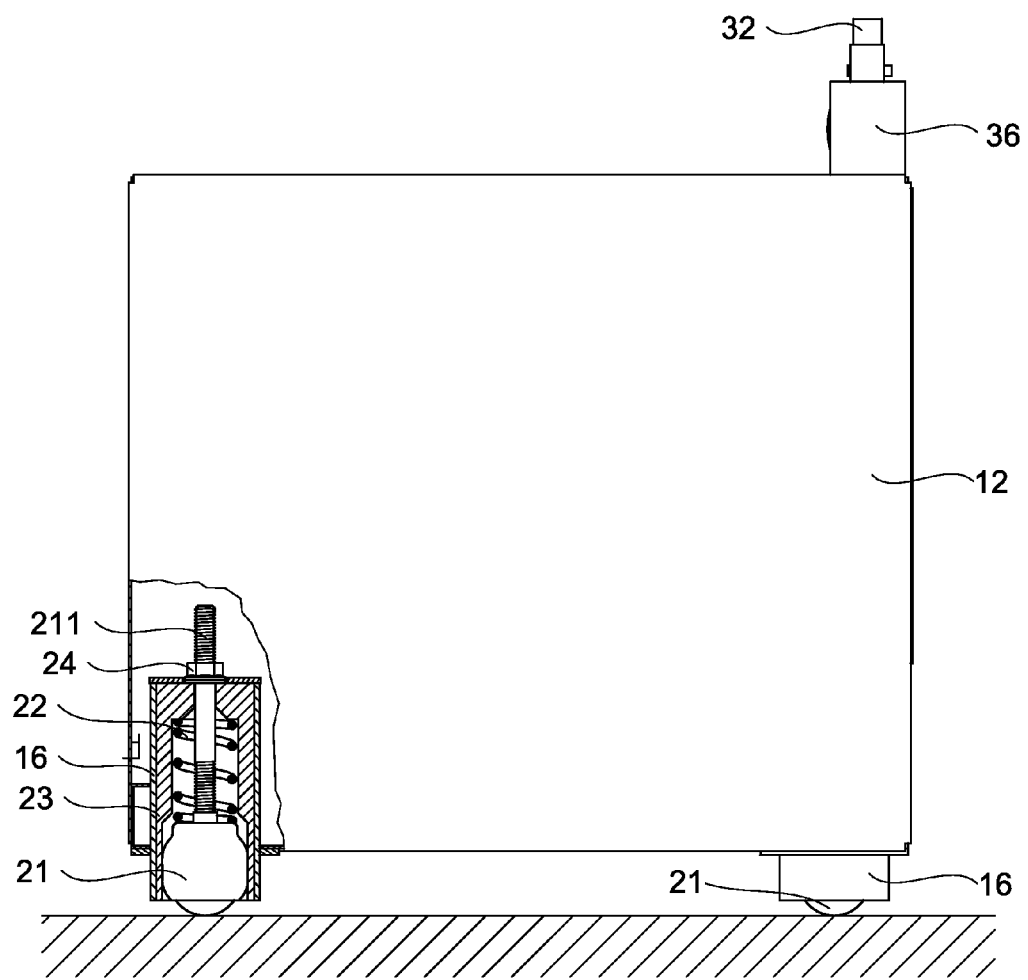
FIG. 5 is a partially broken away view of the mobile cart of FIG. 1.
Figure 5A:
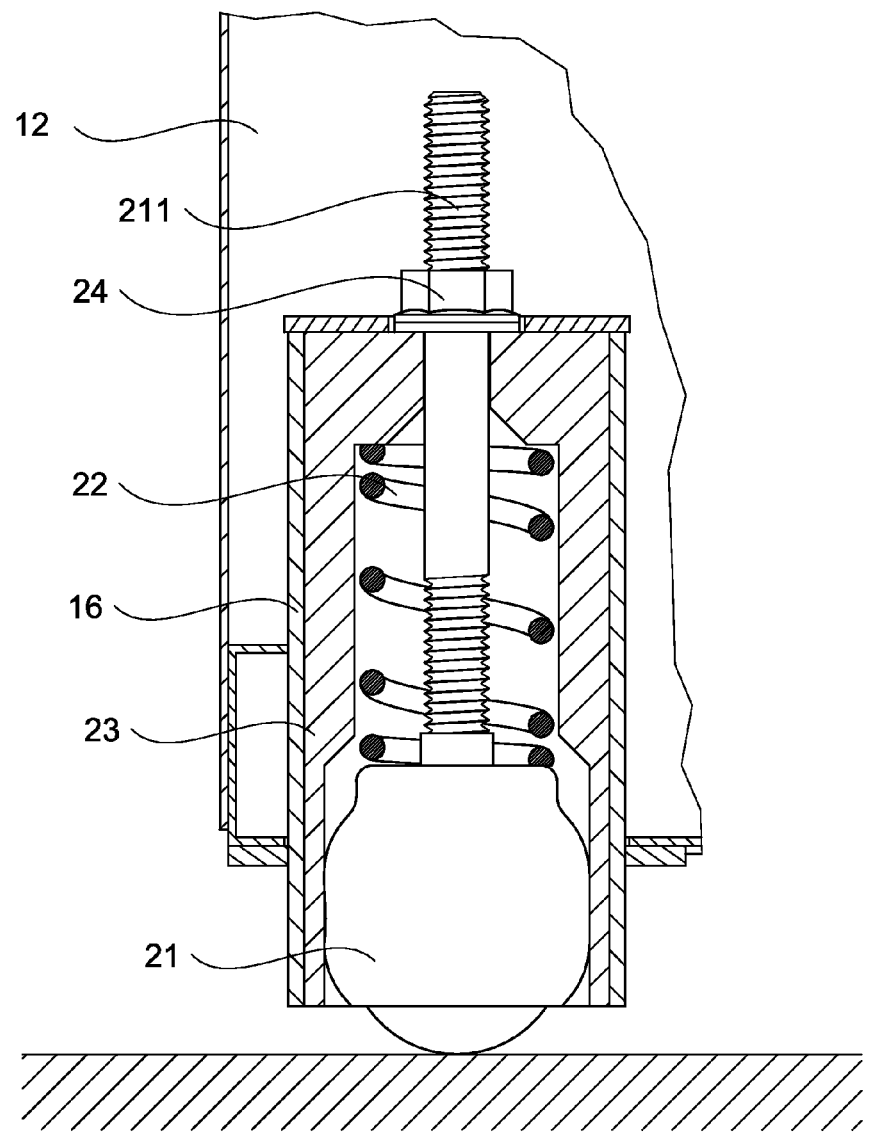
FIG. 5A is an enlarged view of the corner of FIG. 5.

Referring to FIGS. 1 to 13, a parallelepiped mobile cart 1 according to the invention is shown. The mobile cart 1 includes a plurality of drawers 14, a support body 12, a handle assembly 3, a drawer lock assembly 4, four wheel assemblies 2 on four bottom corners respectively, and four lock sleeves 16 on four bottom corners respectively and is discussed in detail below.

The wheel assembly 2 includes a hollow cylinder 23 having a bottom end open, a spring (e.g., torsion spring) 22 disposed in the cylinder 23, a roller 21 having a partially threaded shank 211 inserted through the spring 22 and the cylinder 23 into the support body 12 for fastening, and a nut 24 secured to the shank 211 and rested on a top of the cylinder 23 when the mobile cart 1 is ready to wheel. The lock sleeve 16 is a hollow cylinder secured onto the cylinder 23. The spring 22 is compressed in an internal space of the cylinder 23 having a bottom end substantially defined by a top of the roller 21.

Figure 6:
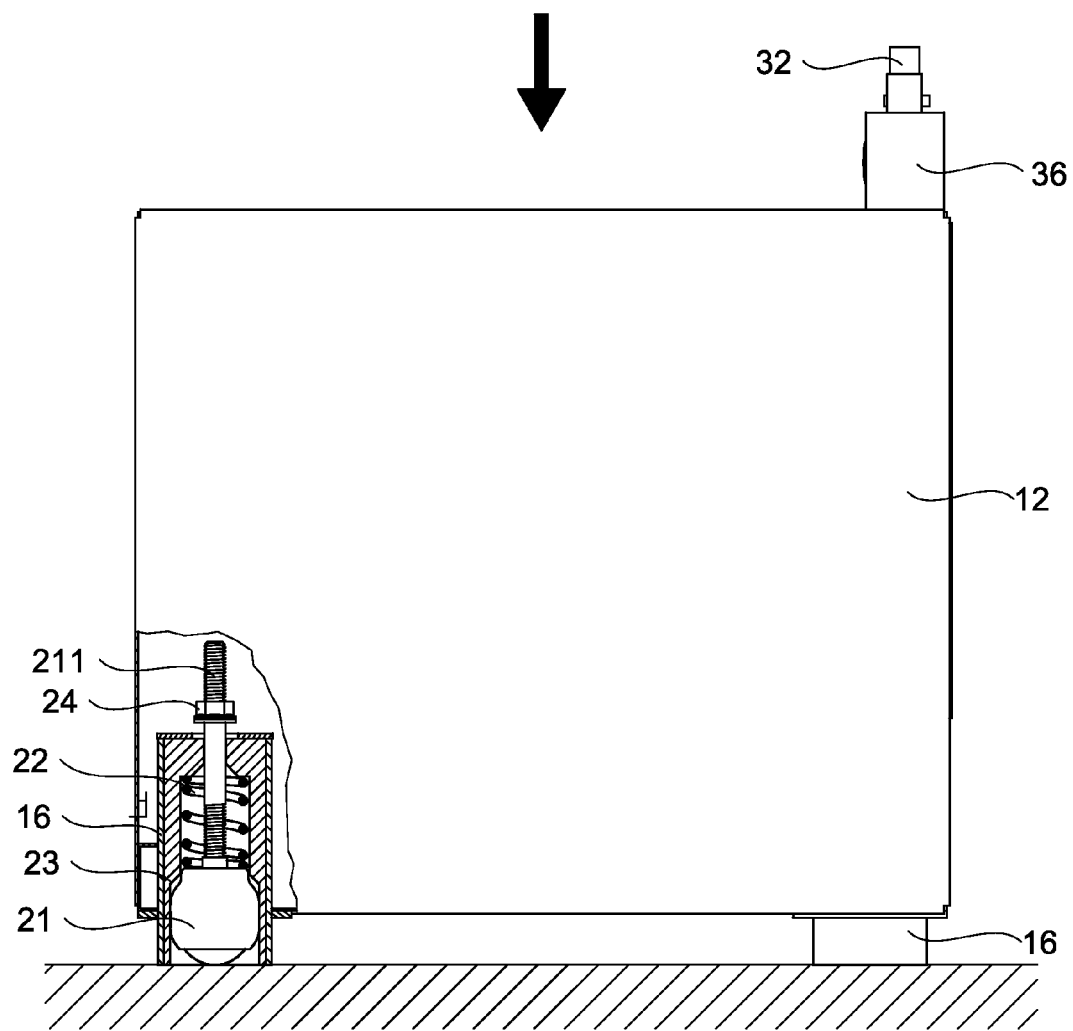
FIG. 6 is a view similar to FIG. 5 where the lock sleeves are pushed down to lockingly engage with the ground in response to a force exerted on the top of the mobile cart.
Figure 6A:
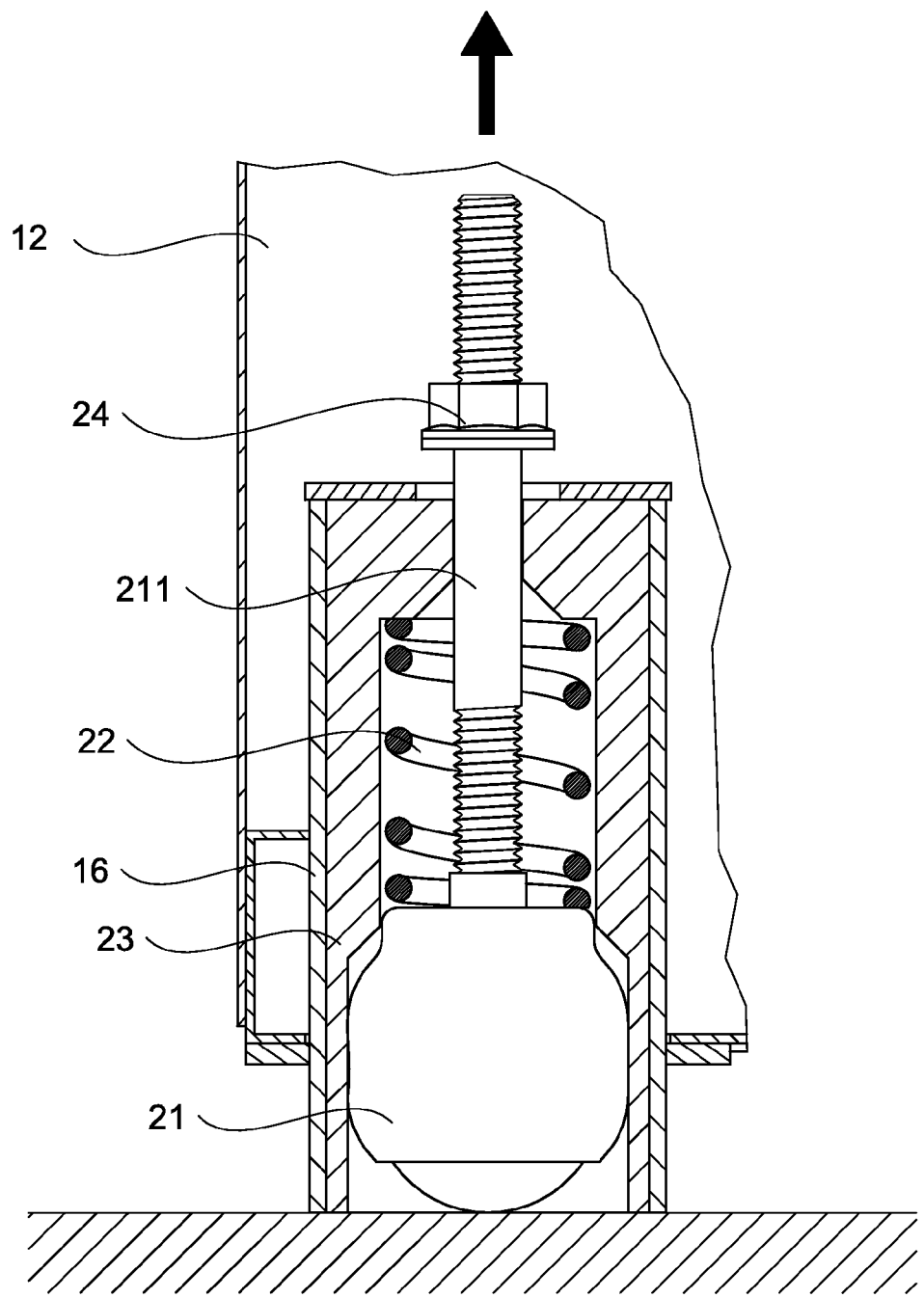
FIG. 6A is an enlarged view of the corner of FIG. 6 showing details.
Figure 7:
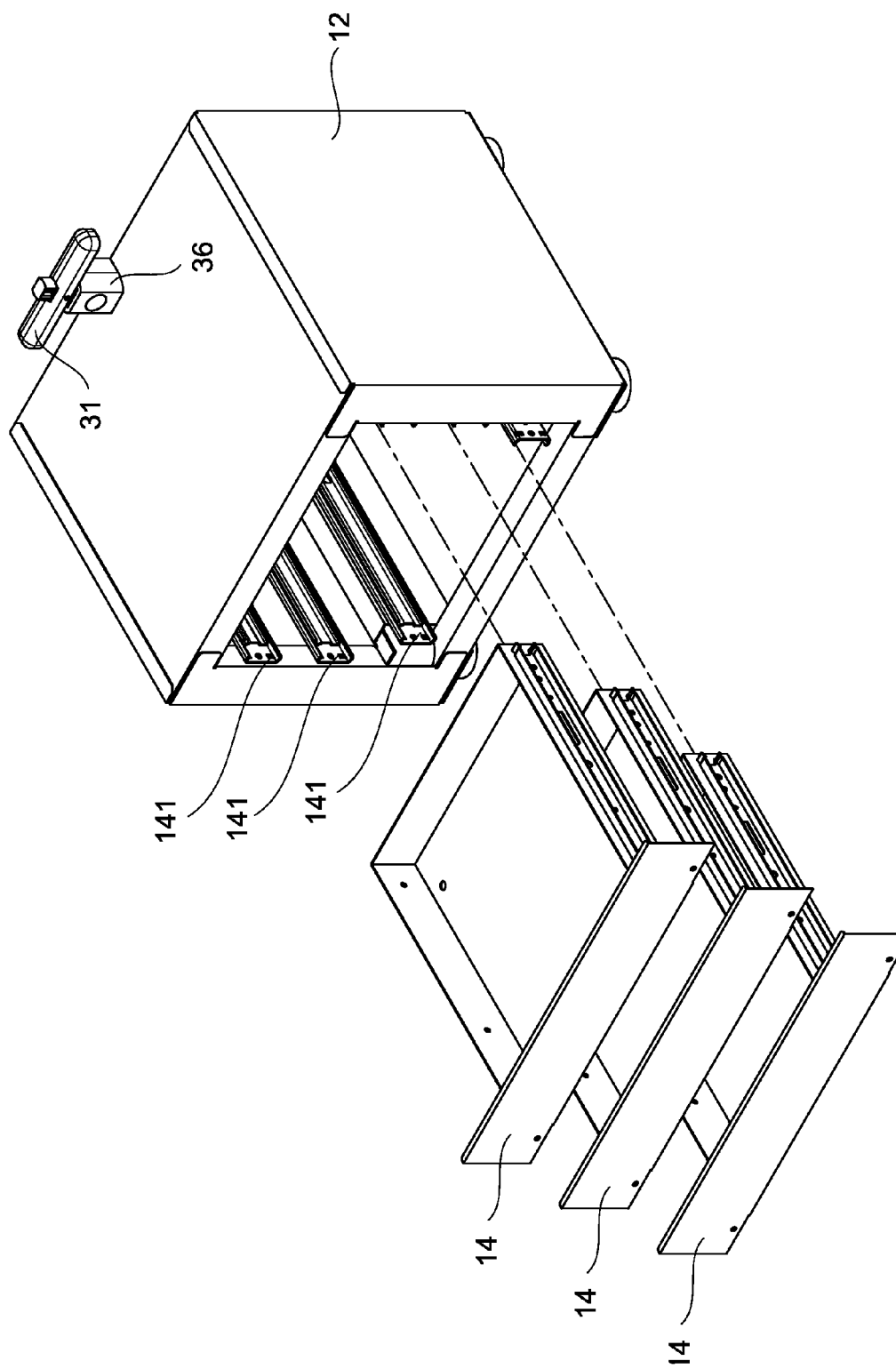
FIG. 7 is an exploded perspective view of the mobile cart of FIG. 1 with the drawers detached.
Figure 8:
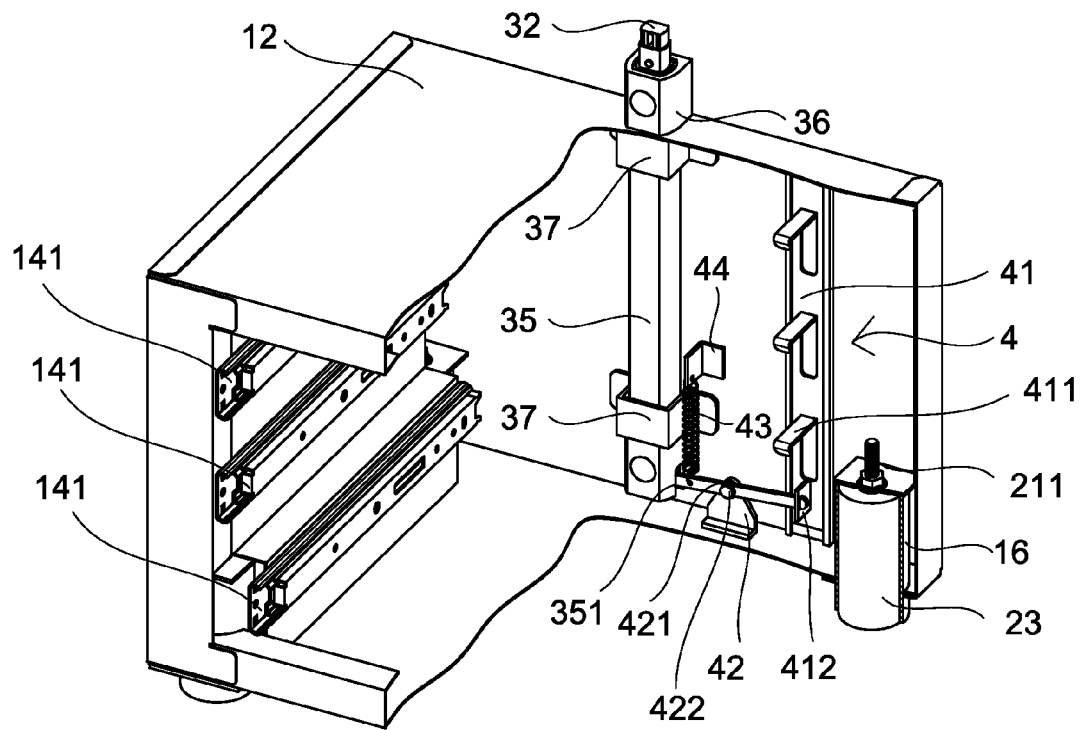
FIG. 8 is a partially broken away view of the mobile cart showing internal details.
Figure 9:
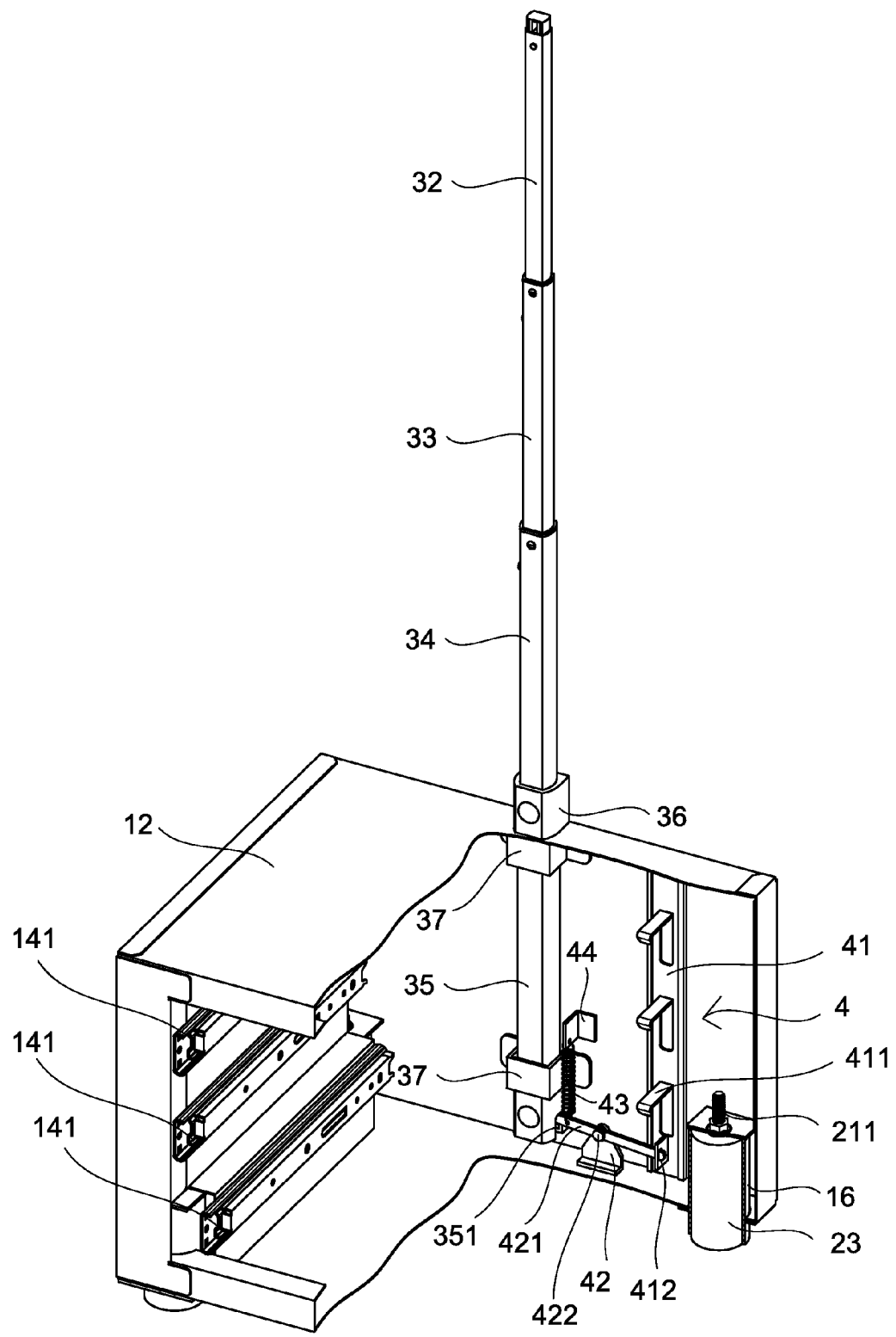
FIG. 9 is a view similar to FIG. 8 with the handle being fully pulled.
Figure 10:
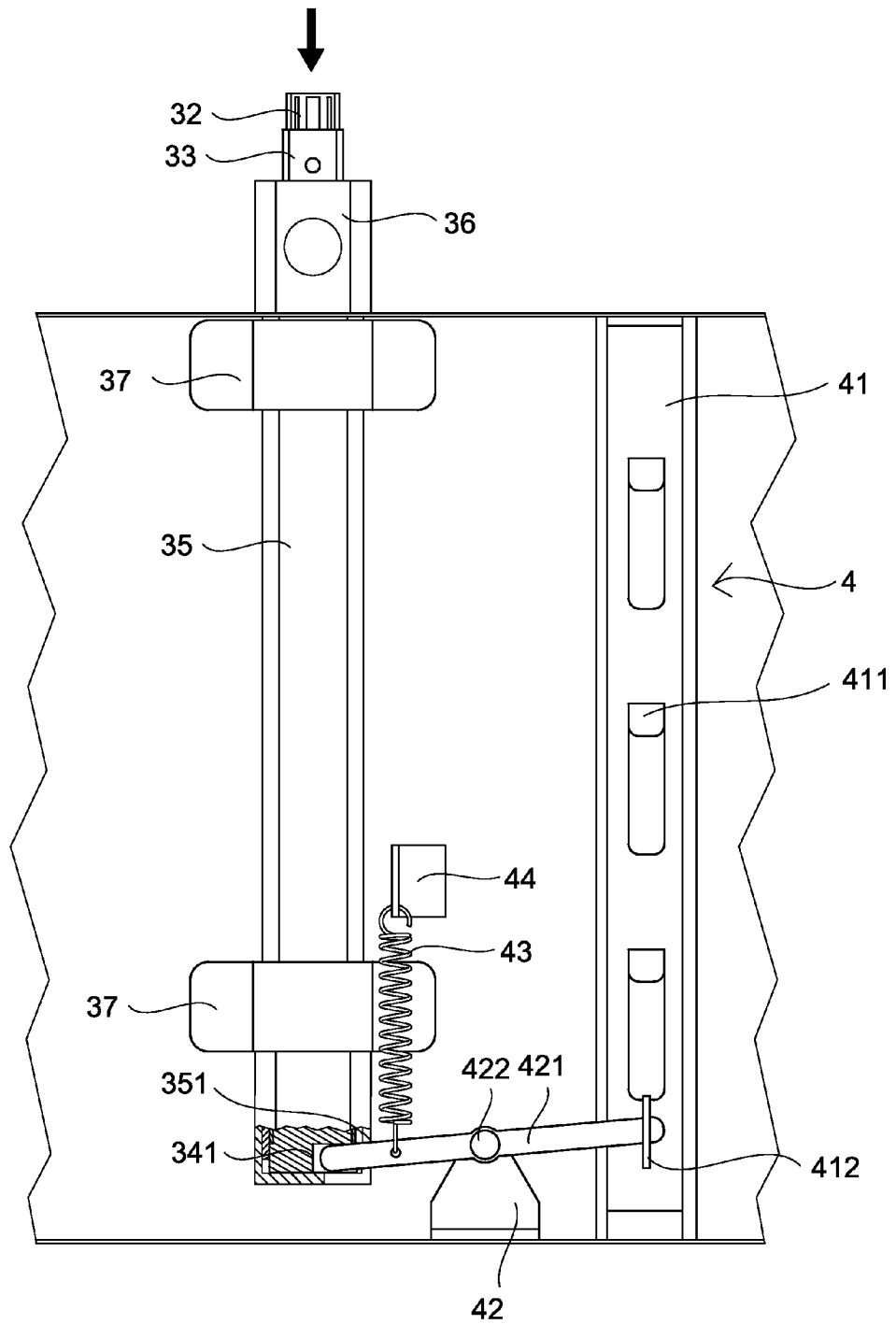
FIG. 10 is an enlarged view of FIG. 8 showing details of the handle and adjacent components in which a pressing force is exerted on the handle to unlock the drawers.
Figure 11:
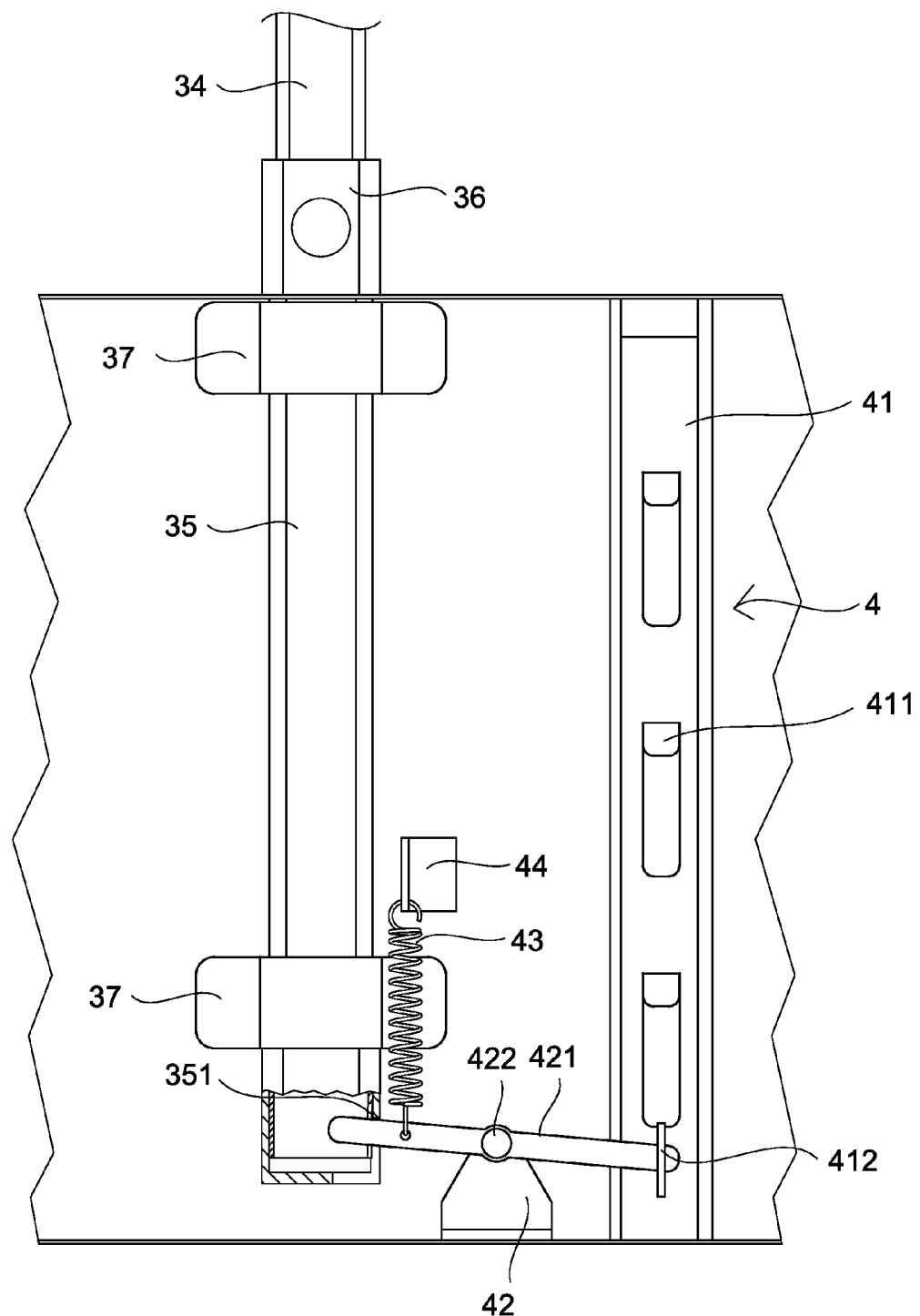
FIG. 11 is a view similar to FIG. 10 showing the handle being pulled up to lock the drawers.
Figure 12:
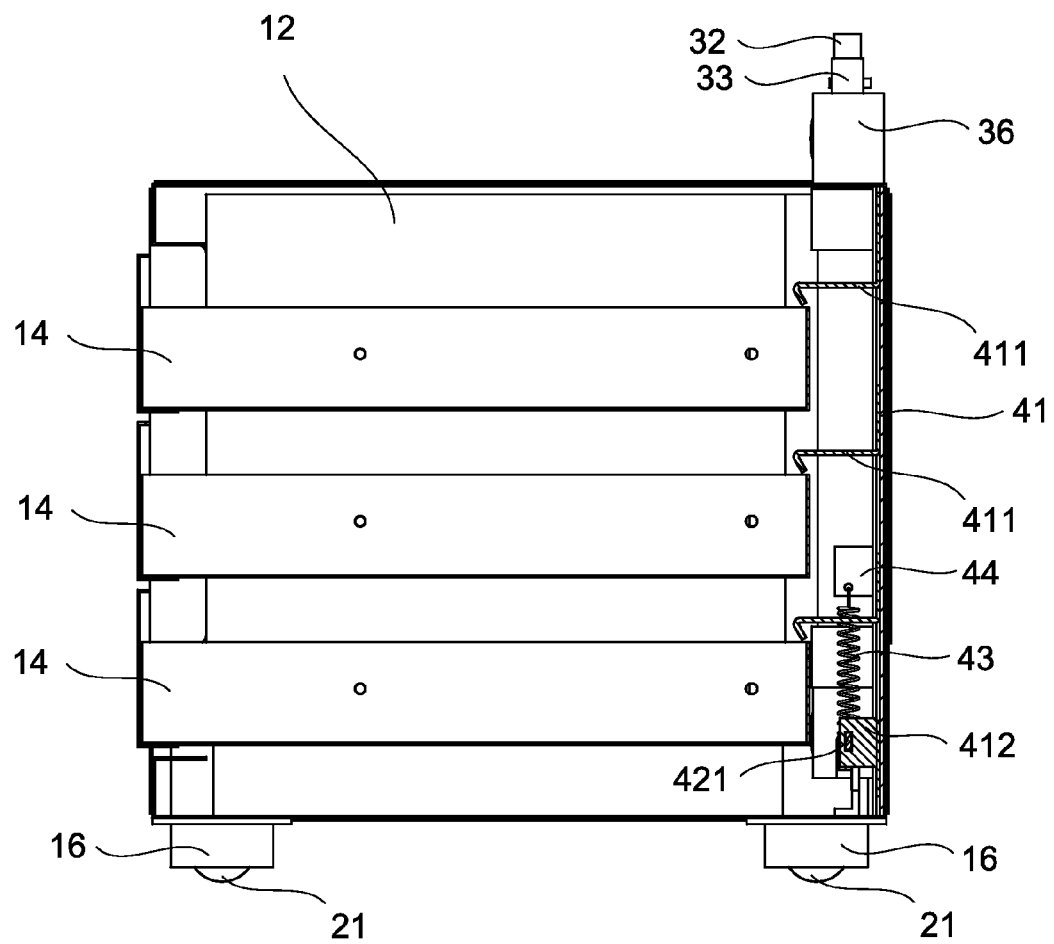
FIG. 12 is a side elevation in part section showing details of the handle assembly.
Figure 13:
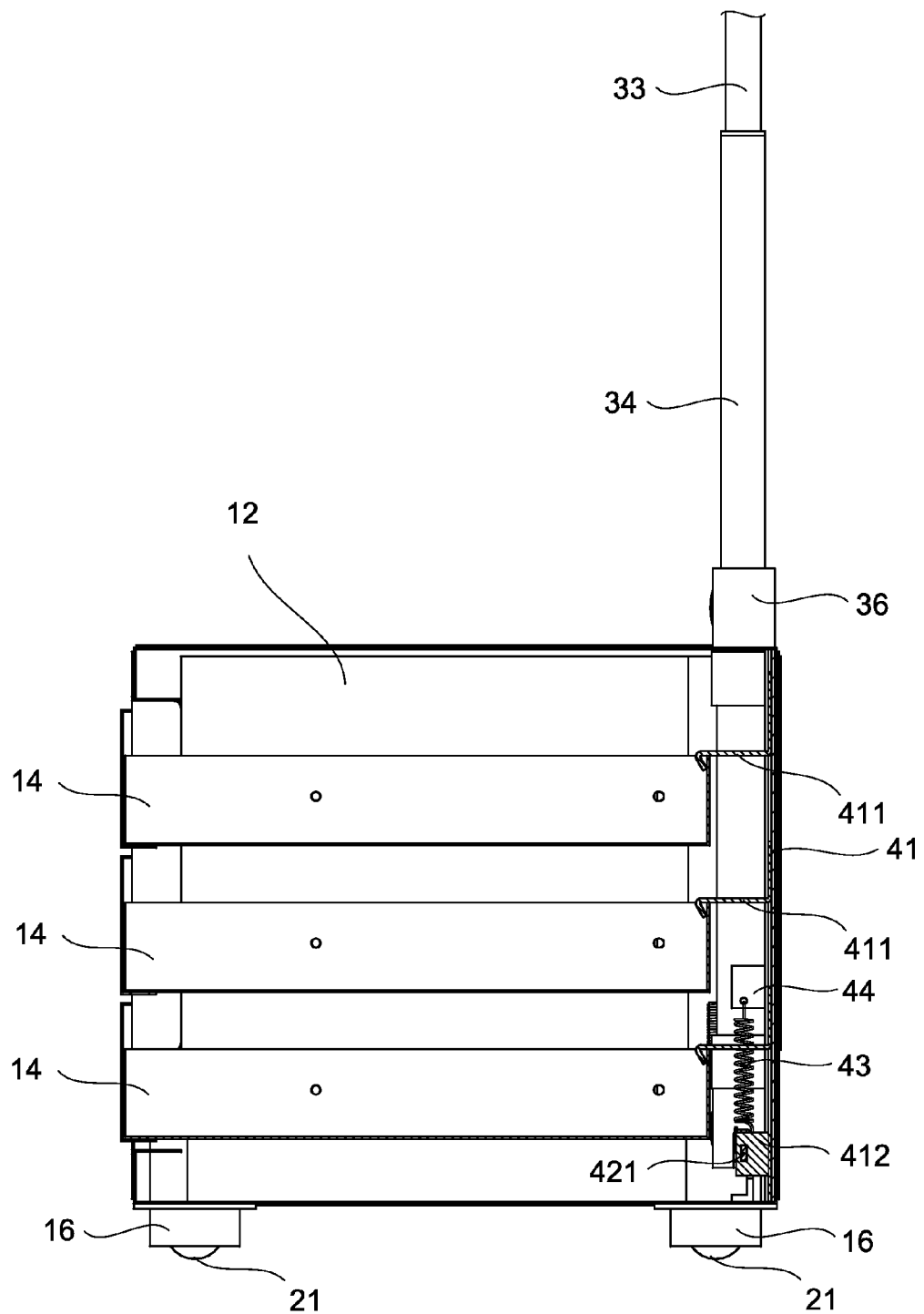
FIG. 13 is a view similar to FIG. 12 with the handle being fully pulled.

In a ready to wheel or wheeling state, both the cylinder 23 and the lock sleeve 16 are above the ground by a distance. In response to a user sitting on the support body 12, both the cylinder 23 and the lock sleeve 16 are pushed down until being stopped by the ground. Also, the spring 22 is further compressed to completely retract the roller 21 into the cylinder 23 (see FIGS. 6 and 6A). Both the cylinder 23 and the lock sleeve 16 can exert a great, sufficient force on the ground to prevent the mobile cart 1 from wheeling, i.e., remain stationary. To the contrary, a releasing of the pushing (i.e., the user standing up) will cause both the cylinder 23 and the lock sleeve 16 to bound upward due to the expansion of the spring 22. Thereafter, the mobile cart 1 can be wheeled again.

The handle assembly 3 is provided on a rear surface of the support body 12 and includes a first support tube 36 disposed on a center of the top of the support body 12, a second support tube 35 extending downward from the first support tube 36 a position proximate to a bottom of the support body 12 along the rear surface, two brackets 37 for securing a top end of the second support tube 35 to the rear surface of the support body 12 and a lower portion of the second support tube 35 to the rear surface of the support body 12, a handle grip 31, a first sliding tube 32 extending downward from a center of the handle grip 31, a second sliding tube 33 adapted to fully receive the first sliding tube 32 from above, and a third sliding tube 34 adapted to fully receive the second sliding tube 33 from above. Further, the third sliding tube 34 is adapted to fully dispose in both the first and second support tubes 36, 35 by downward sliding.

The drawer 14 is slidably disposed in the support body 12 by means of two opposite slide assemblies 141. The drawer lock assembly 4 includes an elongated mounting plate 41 fastened on the rear surface of the support body 12, three inverted L shaped lock members 411 formed on the mounting plate 41 for locking the drawers 4 respectively, a holed plate 412 secured to a bottom of the lowest lock member 41, a lever member 42 disposed on a bottom of the support body 12 and having a bar 421 pivotably secured to a top end of the lever member 42 by means of a fulcrum 422, one end disposed through the holed plate 412 and the other end inserted through an aperture 351 on a lower portion of the second support tube 35 into an activation member 341 on a bottom of the third sliding tube 34, an anchorage member 44 secured to the rear surface of the support body 12, and a torsion spring 43 having one end secured to the anchorage member 44 and the other end secured to a portion of the bar 421 between the fulcrum 422 and the aperture 351.

For locking the drawers 4 (see FIGS. 9, 11, and 13), a user may pull up the handle grip 32 to telescopically slide the first, second, and third sliding tubes 32, 33, and 34 out of the first support tube 36 and the second support tube 35. And in turn, the activation member 341 disengages from the other end of the bar 421 and thus lifts one end of the bar 421. As such, the torsion spring 43 pulls the bar 421 to stop urging the holed plate 412 so that the lock members 411 move downward to its original positions to lock the drawers 14.

For unlocking the drawers 4 (see FIGS. 8, 10, and 12), a user may hold and push down the handle grip 32 to telescopically push the first, second, and third sliding tubes 32, 33, and 34 into the first support tube 36 and the second support tube 35. And in turn, the activation member 341 pushes down the other end of the bar 421 and thus lifts one end of the bar 421. As such, the holed plate 412 is urged to move the lock members 411 to unlock the drawers 14.

It is noted that the provision of the spring 43 facilitates the locking and unlocking operations of the drawer lock assembly 4.

While the invention has been described in terms of preferred embodiments, those skilled in the art will recognize that the invention can be practiced with modifications within the spirit and scope of the appended claims.

What is claimed is:

1. A cart comprising:
   a support body;
   a plurality of drawers slidably disposed in the support body;
   four wheel assemblies disposed on four bottom corners of the support body respectively, each of the wheel assemblies includes a hollow cylinder, a biasing member disposed in the hollow cylinder, a roller biased downward by the biasing member and having a partially threaded shank inserted through the biasing member and the hollow cylinder into the support body for fastening, and a threaded fastener secured to the partially threaded shank;
   four lock sleeves each secured onto the hollow cylinder;
   wherein in a ready to wheel or wheeling state, the partially threaded shank of each of the wheel assemblies is rested on a top of the hollow cylinder, and both the cylinder and the lock sleeve are above a bottom end of the roller of each of the wheel assemblies; and
   wherein in response to a force exerted on the top of the support body greater than a predetermined value, both the hollow cylinders and the lock sleeves are pushed down with the biasing members being further compressed until bottoms of both the hollow cylinders and the lock sleeves are flush with a bottom of the roller of each of the wheel assemblies.

2. The cart of claim 1, further comprising a handle assembly and a drawer lock assembly.

3. The cart of claim 2, wherein the handle assembly is disposed on a rear surface of the support body and includes a handle grip, a first sliding tube extending downward from the handle grip, a second sliding tube adapted to fully receive the first sliding tube from above, a third sliding tube adapted to fully receive the second sliding tube from above, a first support tube disposed on the top of the support body, and a second support tube extending downward from the first support tube to be disposed a position proximate to a bottom of the support body wherein the third sliding tube is adapted to fully dispose in both the first and second support tubes.

4. The cart of claim 3, further comprising a plurality of two opposite slide assemblies disposed on inner surface of both sides of the support body for slidably moving the drawers into or out of the support body; wherein the drawer lock assembly includes a mounting plate fastened on the rear surface of the support body, a plurality of inverted L shaped lock members formed on the mounting plate, a holed plate secured to a bottom of the lowest one of the lock members, a lever member disposed on a bottom of the support body and having a pivotal bar having one end disposed through the holed plate and the other end inserted through an aperture on a lower portion of the second support tube into an activation member on a bottom of the third sliding tube, an anchorage member secured to the rear surface of the support body, and a biasing element having one end secured to the anchorage member and the other end secured to a portion of the bar proximate the aperture; wherein a pulling up of the handle grip telescopically slides the first, second, and third sliding tubes out of the first and second support tubes, causes the activation member to disengage from the other end of the bar and lifts one end of the bar, and causes the biasing member to pull the bar to stop urging the holed plate so that the lock members move downward to its original positions to lock the drawers; and wherein a pushing down of the handle grip telescopically push the first, second, and third sliding tubes into the first and second support tubes, causes the activation member to push down the other end of the bar, and lifts one end of the bar so that the holed plate is urged to move the lock members to unlock the drawers.

* * * * *